United States Patent Office 3,728,333
Patented Apr. 17, 1973

3,728,333
METHOD OF OBTAINING MONOHYDRATE OF SODIUM SALT OF 6 - (3 - PHENYL-5-METHYL-ISOXAZOLE - 4 - CARBAMINO)-PENICILLANIC ACID
Marina Alexeevna Panina, ulitsa Gorkogo 4, kv. 59, Moscow, U.S.S.R.; Gersh Izrailevich Kleiner, Moskovskaya ulitsa 57, kv. 15, Riga, U.S.S.R.; Ivan Timofeevich Strukov, Balaklavsky prospekt 20, korpus 3, kv. 209; and Alexandra Fedorovna Zdobnova, Sevastopolsky prospekt 38, kv. 24, both of Moscow, U.S.S.R.; Maria Kuzminichna Andreeva, ulitsa Strautu 62, kv. 1, Riga, U.S.S.R.; and Nonna Mikhailovna Ryabova, Varshavskoe shosse 69, korpus 1, kv. 140, Moscow, U.S.S.R.
No Drawing. Filed Nov. 4, 1970, Ser. No. 86,990
Int. Cl. C07d 99/16
U.S. Cl. 260—239.1     3 Claims

ABSTRACT OF THE DISCLOSURE

A method of obtaining a monohydrate of sodium salt of 6 - (3 - phenyl-5-methylisoxazole-4-carbamine)-penicillanic acid consisting in that 6-aminopenicillanic acid is made to interact with acid chloride of 3-phenyl-5-methylisoxazole-4-carboxylic acid in an aqueous-acetone medium in the presence of sodium bicarbonate at pH=7-8, then 6-(3-phenyl - 5 - methylisoxazole - 4 - carbamino)-penicillanic acid is extracted from the reaction mass, for example, with butylacetate while being acidified to pH=1-3, then the obtained extract is treated with an equimolecular amount of sodium salt of acetic acid and the desired product is separated.

This invention relates to methods of obtaining salts of semisynthetic penicillins, in particular to a method of obtaining monohydrate of sodium salt of 6-(3-phenyl-5-methylisoxazole-4-carbamino)-penicillanic acid belonging to the group of antibiotics resistant against penicillinase-producing staphylococci and stable in an acid medium.

A monohydrate of sodium salt of 6-(3-phenyl-5-methylisoxazole-4-carbamino)-penicillanic acid has the following formula:

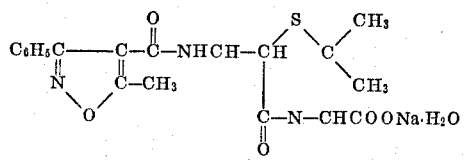

The preparation finds application in medical practice under the name of oxacilline.

There are conventional methods of obtaining sodium salt of 6-(3-phenyl-5-methylisoxazole-4-carbamino) - penicillanic acid, for instance, a method consisting in that 6-aminopenicillanic acid is acylated by acid chloride of 5-methyl - 3 - phenylisoxazole-4-carboxylic acid in an aqueous-acetone solution in the presence of excess sodium bicarbonate, the reaction mixture is acidified with a mineral acid and 6-(3 - phenyl-5-methylisoxazole-4-carbamino)-penicillanic acid is extracted with ethyl ether, then treated with an aqueous solution of sodium bicarbonate with subsequent evaporation of aqueous solution of sodium salt of 6-(3-phenyl-5-methylisoxazole-4-carbamino)-penicillanic acid at low temperature and pressure.

The above method is disadvantageous in that the process takes too much time which leads to inactivation of the antibiotic, the apparatus required is too complicated, and the desired product is obtained in an amorphous form featuring a low content of the active substance, about 66 weight percent.

Another conventional method of obtaining monohydrate of sodium salt of 6-(3-phenyl-5-methylisoxazole-4-carbamino)-penicillanic acid consists in acylating 6-aminopenicillanic acid by acid chloride of 5-methyl-3-phenylisoxazole-4-carboxylic acid with subsequent acidification of reaction mixture and extraction of 6-(3-phenyl-5-methylisoxazole-4-carbamino) - penicillanic acid with butylacetate. Added to the obtained butylacetate extract is an equimolecular amount of caustic soda in a solution of an aliphatic alcohol and, then, the desired product is separated. The desired product is obtained in a crystalline form with a content of the active substance of up to 98 weight percent. The yield is 64 weight percent as calculated for 6-aminopenicillanic acid.

The above method is disadvantageous in that it yields a poor amount of the desired product.

The object of the present invention is to eliminate the above disadvantages.

It is a specific object of this invention to increase the yield and improve the quality of the desired product by changing the technological operations and to simplify the technological process while obtaining the desired product suitable both for peroral and parenteral application.

Said object is accomplished in that, when applying the method of obtaining monohydrate of sodium salt of 6-(3-phenyl - 5 - methylisoxazole-4-carbamino)-penicillanic acid by making 6-aminopenicillanic acid interact with acid chloride of 3-phenyl-5-methylisoxazole-4-carboxylic acid in an aqueous-acetone medium in the presence of sodium bicarbonate, extracting 6-(3-phenyl-5-methylisoxazole-4-carbamino)-penicillanic acid from the reaction mixture with an organic solvent with acidification and subsequent separation of the desired product, according to the invention, the obtained organic extract is treated with an equimolecular amount of sodium salt of acetic acid and the desired product is separated.

To obtain good-quality desired product, the obtained organic extract is dried till the moisture is 0.8–1.0 weight percent according to Fisher, thereafter anhydrous sodium salt of acetic acid is added at a temperature of not higher than 50° C. and the crystallized desired product is separated.

To obtain the desired product suitable for parenteral application, the obtained extract is combined with 30–35 percent aqueous solution of sodium salt of acetic acid following which the reaction mixture is concentrated by evaporation at a reduced pressure to 20 percent of the total volume and the crystallized desired product is separated.

The proposed method is carried out as follows. 6-aminopenicillanic acid is acylated with acid chloride of 5-methyl-3-phenylisoxazole - 4 - carboxylic acid in an aqueous-acetone medium in the presence of sodium bicarbonate. The reaction mixture is stirred for 2–2.5 hrs. at room temperature, freed from impurities by treating it with butylacetate, and 6-(3-phenyl-5-methylisoxazole-4-carbamino)-penicillanic acid is extracted with butylacetate while acidifying to pH=2.5–3.0.

Then, added to the butylacetate extract is an equimolecular amount of sodium salt of acetic acid and the desired product is separated.

For obtaining high-quality desired product suitable for peroral application, the obtained butylacetate extract is dried till the residual moisture is not more than 0.8–1 weight percent according to Fisher, then, at a temperature not higher than 50° C. crushed powder of sodium salt of acetic acid is added. The precipitate is isolated, washed and dried. Obtained is the desired product with a content of the active substance of up to 97 weight percent. The yield is 72–76 weight percent calculated for 6-aminopenicillanic acid.

In order to obtain the desired product suitable for parenteral application, the obtained butylacetate solution is passed through a bacteriocide filter, then 30–35 percent aqueous solution of sodium salt of acetic acid is added, and the resulting solution is vacuum-evaporated to 20 percent of the total volume. The resultant crystalline precipitate is filtered off, washed and dried.

Obtained is the desired product with a content of the active substance of 97–99 weight percent. The yield is 85–87 weight percent as calculated for 6-aminopenicillanic acid.

The proposed method allows an increase in the yield of the desired product of up to 74–87 weight percent (as compared to 64 weight percent by the conventional method).

Application of sodium salt of acetic acid simplifies the technology of the process and allows the crystalline desired product of high purity to be obtained.

The desired product obtained according to the proposed method can be used for peroral and parenteral application.

For a better understanding of the present invention, following are some examples of realization of the method for obtaining monohydrate of sodium salt of 6-(3-phenyl-5-methylisoxazole-4-carbamino)-penicillanic acid.

EXAMPLE 1

A mixture of 196 g. (0.965 mole) of 5-methyl-3-phenylisoxazole-4-carboxylic acid, 134 g. (1.13 mole) of thionylchloride, 2 ml. of dimethylformamide in 304 ml. of benzene is stirred for 3.5 hrs. at a temperature of 52–56° C. (an oil bath) and then vacuum-evaporated at the same temperature to remove excess thionylchloride and solvent. Obtained is 210 g. (93.6 percent of the theoretical amount) of acid chloride of 5-methyl-3-phenylisoxazole-4-carboxylic acid. 200.0 g. (0.9 mole) of the obtained acid chloride is dissolved in 1 l. of acetone and, while stirring for 20 min., is added to the solution of 204 g. (0.94 mole) of 6-aminopenicillanic acid and 200 g. of sodium bicarbonate (0.94 mole) in 5 l. of water and 1.4 l. of acetone, said solution being cooled down to 0–2° C. The solution is stirred for 2.5 hrs. at room temperature and butylacetate is extracted two times, 1 l. each time. The aqueous layer is separated and 1.6 l. of butylacetate is again extracted while acidifying with 0.85 l. of 10 percent sulphuric acid to pH=3–2.32. The extraction of 1 l. butylacetate is repeated again at pH=2.35. The combined butylacetate extract which is washed with water, is then dried with magnesium sulphate to an adequate moisture content of not more than 0.8 percent according to Fisher, and is heated up to a temperature of +50° C. and treated for 5 min. with 77.7 g. (0.94 mole) of crushed sodium acetate. When a precipitate appears, the mixture is gently stirred while gradually lowering the temperature from 50° C. to 30° C. The precipitate is separated, washed with 1.0 l. of butylacetate, then washed twice with 1.0 l. of acetone each time, and dried at a temperature of 50–60° C. in a vacuum (5–10 mm. Hg) for 3 hrs. Obtained is 317 g. of monohydrate of sodium salt of 6-(3-phenyl-5-methylisoxazole-4-carbamino)-penicillanic acid with a content of active substance of 97 percent as determined spectrophotometrically. The yield is 74.3 weight percent as calculated for 6-aminopenicillanic acid.

EXAMPLE 2

The process of obtaining 6-(3-phenyl-5-methylisoxazole-4-carbamino)-penicillanic acid is carried out as described in Example 1, using 1.036 kg. of 6-aminopenicillanic acid and 1.06 kg. of acid chloride of 5-methyl-3-phenylisoxazole-4-carboxylic acid. The obtained 6-(3-phenyl-5-methylisoxazole - 4 - carbamino)-penicillanic acid is extracted with 17 l. of butylacetate and diluted with butylacetate until the concentration is 45–50 mg./ml. (as determined iodometrically). The obtained solution is filtered through a Salnikoff filter with asbestos plates of Cφ type or a Solvinert membrane filter, and mixed with a 35 percent aqueous solution of sodium salt of acetic acid heated up to a temperature of 40–50° C. in an amount which is equal to the total acidity of the butylacetate solution. The aqueous solution of salt is first filtered through a millipore filter. The mixture is stirred for 2 hrs. while being gradually cooled down to a temperature of 20–35° C., then evaporated to 10–15 percent of the initial volume at 40–50 mm. Hg and a temperature of 50° C.

The crystalline residue is filtered, washed twice with 1 l. of acetone each time and dried at a temperature of 60° C. and 30–50 mm. Hg. Obtained is 1.76 kg. of the desired product with a content of the active substance of 97–99 weight percent as determined spectrophotometrically. The yield is 87 weight percent as calculated for 6-aminopenicillanic acid.

What is claimed is:

1. A method of obtaining a monohydrate of sodium salt of 6-(3-phenyl-5-methylisoxazole-4-carbamino)-penicillanic acid which comprises reacting 6-aminopenicillanic acid with acid chloride of 3-phenyl-5-methylisoxazole-4-carboxylic acid in an aqueous-acetone medium in the presence of sodium bicarbonate at pH=7–8, extracting 6-(3-phenyl - 5 - methylisoxazole-4-carbamino)-penicillanic acid from the reaction mass with an organic solvent, thereafter treating the obtained extract with an equimolecular amount of sodium salt of acetic acid and separating the desired product.

2. A method as claimed in claim 1, wherein the obtained organic extract is dried to 0.8–1.0 weight percent of moisture content, then anhydrous sodium salt of acetic acid is added at a temperature of not higher than 50° C. and the crystallized desired product is separated.

3. A method as claimed in claim 1, wherein added to the obtained extract is a 30–35 percent aqueous solution of sodium salt of acetic acid, then the reaction mass is evaporated at a low pressure to 20 percent of the total volume and the crystallized product is separated.

References Cited
UNITED STATES PATENTS

| | | | |
|---|---|---|---|
| 2,996,501 | 8/1961 | Doyle et al. | 260—239.1 |
| 3,567,709 | 3/1971 | Panina et al. | 260—239.1 |

NICHOLAS S. RIZZO, Primary Examiner

U.S. Cl. X.R.

424—271